(12) United States Patent
Yokouchi

(10) Patent No.: US 9,842,383 B2
(45) Date of Patent: Dec. 12, 2017

(54) IMAGE PROCESSING DEVICE

(71) Applicant: HOYA CORPORATION, Tokyo (JP)

(72) Inventor: Fumika Yokouchi, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 15/037,808

(22) PCT Filed: Mar. 26, 2015

(86) PCT No.: PCT/JP2015/059360
§ 371 (c)(1),
(2) Date: May 19, 2016

(87) PCT Pub. No.: WO2015/156142
PCT Pub. Date: Oct. 15, 2015

(65) Prior Publication Data
US 2016/0292828 A1    Oct. 6, 2016

(30) Foreign Application Priority Data

Apr. 11, 2014    (JP) .................. 2014-081918

(51) Int. Cl.
*G06K 9/40*    (2006.01)
*G06T 5/00*    (2006.01)
(Continued)

(52) U.S. Cl.
CPC ............ *G06T 5/002* (2013.01); *G06T 7/223* (2017.01); *H04N 5/21* (2013.01);
(Continued)

(58) Field of Classification Search
CPC ....... G06T 5/002; G06T 7/223; G06T 7/2013; G06T 2207/20182; H04N 5/144; H04N 5/21; H04N 5/232; H04N 5/357
See application file for complete search history.

(56) References Cited

U.S. PATENT DOCUMENTS 5,276,512 A * 1/1994 Onda ................... H04N 5/144
348/620
6,115,502 A    9/2000 De Haan et al.
(Continued)

FOREIGN PATENT DOCUMENTS

JP         9-138356        5/1997
JP         2000-502549     2/2000
(Continued)

OTHER PUBLICATIONS

Office Action in related Canadian Application No. 2931074, dated Jan. 27, 2017.
(Continued)

*Primary Examiner* — Ali Bayat
(74) *Attorney, Agent, or Firm* — Greenblum & Bernstein, P.L.C.

(57) ABSTRACT

An image processing device is constituted by a device for detecting motion of the subject, with the entire effective pixel region as a range; a device for successively setting each of the pixels in the effective pixel region as a pixel of interest; a device for detecting motion of the subject, with a local pixel region that includes the successively set pixel of interest as a range; a device for, for each of the pixels of interest, determining a mixing ratio for the pixel signal of the current imaging period and the pixel signal of one imaging period earlier based on the two detection results; and a device for, for each of the pixels of interest, correcting the pixel signal of the current imaging period based on the determined mixing ratio.

7 Claims, 6 Drawing Sheets

(51) Int. Cl.
*H04N 5/21* (2006.01)
*G06T 7/223* (2017.01)
*H04N 5/232* (2006.01)
*H04N 9/07* (2006.01)
*H04N 5/14* (2006.01)

(52) U.S. Cl.
CPC .......... *H04N 5/23254* (2013.01); *H04N 9/07* (2013.01); *G06T 2207/20182* (2013.01); *H04N 5/144* (2013.01)

(56) References Cited

U.S. PATENT DOCUMENTS

| | | | |
|---|---|---|---|
| 6,130,707 | A | 10/2000 | Koller et al. |
| 6,847,408 | B1 | 1/2005 | Webb |
| 8,248,491 | B2 * | 8/2012 | On .................. H04N 5/144 348/241 |
| 8,351,511 | B2 | 1/2013 | Mitsuya et al. |
| 8,750,635 | B2 | 6/2014 | Yokokawa et al. |
| 2008/0129873 | A1 | 6/2008 | Nagano et al. |
| 2010/0020244 | A1 | 1/2010 | Mitsuya et al. |
| 2012/0154675 | A1 * | 6/2012 | Nasu .................. H04N 7/014 348/452 |
| 2012/0287294 | A1 | 11/2012 | Kaizu et al. |
| 2012/0287311 | A1 | 11/2012 | Chuang et al. |
| 2013/0084024 | A1 | 4/2013 | Yokokawa et al. |
| 2015/0304672 | A1 * | 10/2015 | Takefumi ............ H04N 19/159 375/240.12 |
| 2016/0006978 | A1 * | 1/2016 | Satoh ................ H04N 5/23267 386/269 |

FOREIGN PATENT DOCUMENTS

| | | |
|---|---|---|
| JP | 2000-209507 | 7/2000 |
| JP | 2009-290827 | 12/2009 |
| JP | 2012-19426 | 1/2012 |
| JP | 2012-129913 | 7/2012 |
| JP | 2013-74571 | 4/2013 |

OTHER PUBLICATIONS

Examination Report in related Australian Application No. 2015244984, dated Mar. 10, 2017.
Office Action in related Korean Application No. KR 10-2016-7015786, with English language translation thereof, Mar. 23, 2017.
International Search report in PCT/JP2015/059360, dated Jun. 16, 2015.
Extended European Search Report in EP15776531.4, dated Sep. 29, 2017.

* cited by examiner

FIG. 5
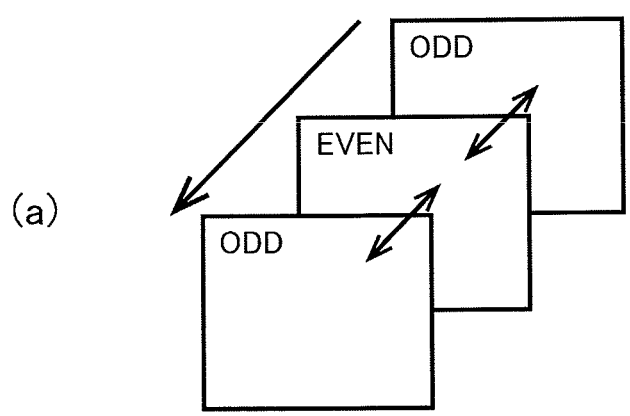
(a)
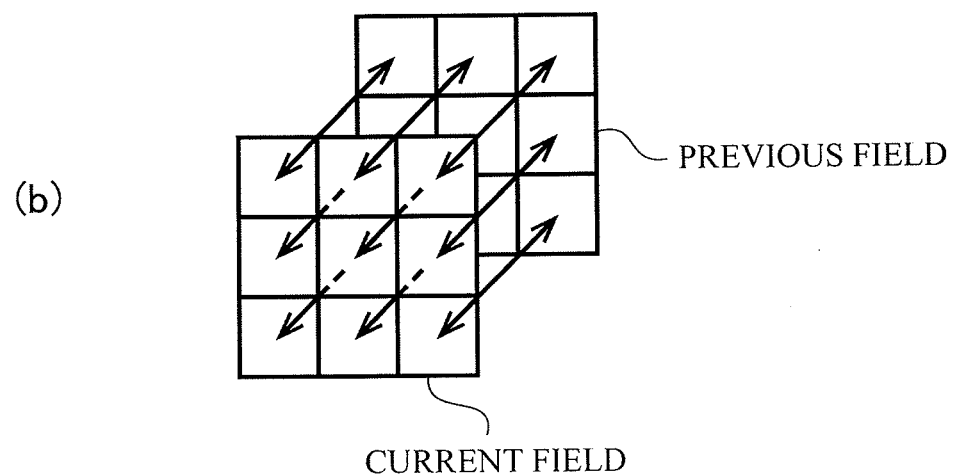
(b)

FIG. 6
(a) 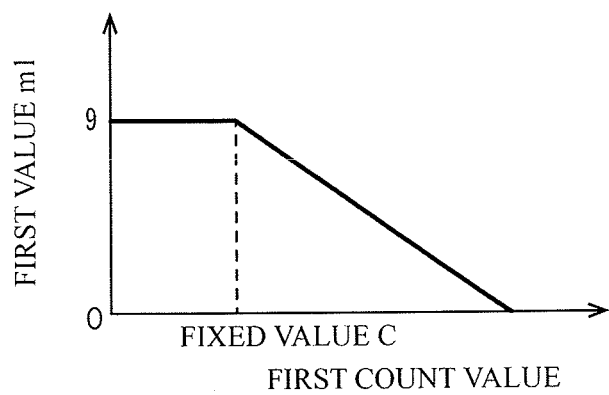
(b) 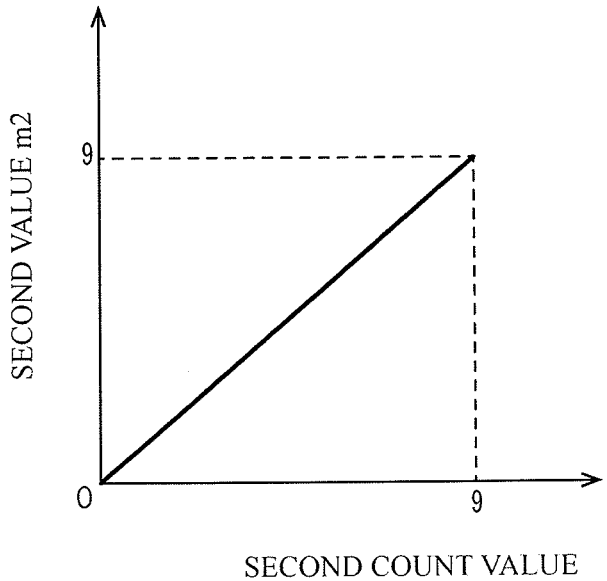

IMAGE PROCESSING DEVICE

TECHNICAL FIELD

The present invention relates to an image processing device that generates an image by processing a signal output from an imaging element.

BACKGROUND ART

Image processing devices that generate an image by processing a signal output by an imaging element are known. One known example of such an image processing device suppresses afterimages of a subject that is in motion while also reducing noise in images. A specific configuration of this type of image processing device is recited in JP 2000-209507A (hereinafter, called "Patent Document 1"), for example.

The image processing device recited in Patent Document 1 includes a cyclic noise reduction circuit. The cyclic noise reduction circuit recited in Patent Document 1 uses a subtracter to obtain the difference between the current image signal output from an imaging element and the image signal of one frame earlier or one field earlier, uses a multiplier to multiply the difference value by a feedback coefficient, and uses an adder to add the result of the multiplication to the current image signal, thus reducing a noise component in the image signal. The cyclic noise reduction circuit also controls the feedback coefficient for each pixel according to the difference value from the subtracter. Afterimages are reduced by reducing the feedback coefficient the larger the difference value from the subtracter is, and noise is reduced by increasing the feedback coefficient the smaller the difference value is.

SUMMARY OF INVENTION

However, with the configuration recited in Patent Document 1, it is not possible to sufficiently separate the subject motion component from random noise, and therefore it is not possible to sufficiently suppress afterimages of a subject that is in motion.

The present invention was achieved in light of the aforementioned situation, and an object thereof is to provide an image processing device suited to suppressing an afterimage of a subject that is in motion while also reducing noise in an image.

An image processing device according to an embodiment of the present invention includes: a difference value calculation means for, for each pixel in an effective pixel region of an imaging element that cyclically images a subject in a predetermined imaging period, calculating a difference value between a pixel signal of a current imaging period output by the imaging element and a pixel signal of one imaging period earlier; a first motion detection means for detecting motion of the subject, with the entire effective pixel region as a range; a pixel of interest setting means for successively setting each of the pixels in the effective pixel region as a pixel of interest; a second motion detection means for detecting motion of the subject, with a local pixel region that includes the successively set pixel of interest as a range; a mixing ratio determination means for, for each of the pixels of interest, determining a mixing ratio for the pixel signal of the current imaging period and the pixel signal of one imaging period earlier, based on a detection result of the first motion detection means and a detection result of the second motion detection means; and a pixel signal correction means for, for each of the pixels of interest, correcting the pixel signal of the current imaging period based on the mixing ratio determined by the mixing ratio determination means.

Also, an image processing device according to an embodiment of the present invention includes: a difference value calculation means for, for each pixel in an effective pixel region of an imaging element that cyclically images a subject in a predetermined imaging period, calculating a difference value between a pixel signal of a current imaging period output by the imaging element and a pixel signal of one imaging period earlier; a first counting means for counting the number of pixels for which the difference value satisfies a first condition in the effective pixel region, and setting the counted number of pixels as a first count value; a pixel of interest setting means for successively setting each of the pixels in the effective pixel region as a pixel of interest; a second counting means for counting the number of pixels for which the difference value satisfies a second condition in a pixel group made up of the successively set pixel of interest and surrounding pixels around the pixel of interest, and setting the counted number of pixels as a second count value; a mixing ratio determination means for, for each of the pixels of interest, determining a mixing ratio for the pixel signal of the current imaging period and the pixel signal of one imaging period earlier, based on the second count value in the pixel group to which the pixel of interest belongs and the first count value; and a pixel signal correction means for, for each of the pixels of interest, correcting the pixel signal of the current imaging period based on the mixing ratio determined by the mixing ratio determination means.

The mixing ratio determination means may be configured to convert the first count value to a first value, and convert the second count value to a second value. In this case, the mixing ratio determination means determines the mixing ratio for the pixel signal of the current imaging period and the pixel signal of one imaging period earlier based on a difference value between the first value and the second value.

Also, a numerical value range of the first value and a numerical value range of the second value may be the same.

Also, the first condition is that the difference value calculated by the difference value calculation means is larger than a first threshold value, for example. Also, the second condition is that the difference value is smaller than a second threshold value, for example. In this case, the first count value is converted to a maximum value in the numerical value range if the first count value is smaller than or equal to a fixed value, and is converted to a smaller value relative to the maximum value the higher above the fixed value the first count value is. Also, the second count value is converted as is to the second count value. The mixing ratio determination means then determines the mixing ratio based on the first value and the second value in a case where the difference value between the first value and the second value is greater than or equal to a third threshold value, and determines the mixing ratio based on the first value or the second value in a case where the difference value between the first value and the second value is less than the third threshold value.

The imaging period of the imaging element is one field period or one frame period, for example.

According to an embodiment of the present invention, an image processing device suited to suppressing an afterimage of a subject that is in motion while also reducing noise in an image is provided.

BRIEF DESCRIPTION OF DRAWINGS

FIG. 5 is a diagram conceptually showing motion detection in an entire field (FIG. 5(a)) and a diagram conceptually showing motion detection in a local region (FIG. 5(b)).

FIG. 6 is a graph showing a function for conversion between a first count value and a first value m1 (FIG. 6(a)) and a graph showing a function for conversion between a second count value and a second value m2 (FIG. 6(b)).

DESCRIPTION OF EMBODIMENTS

Hereinafter, an embodiment of the present invention will be described with reference to the drawings. Note that an electronic endoscope system is taken as an example of one embodiment of the present invention in the following description.

Figure 1:
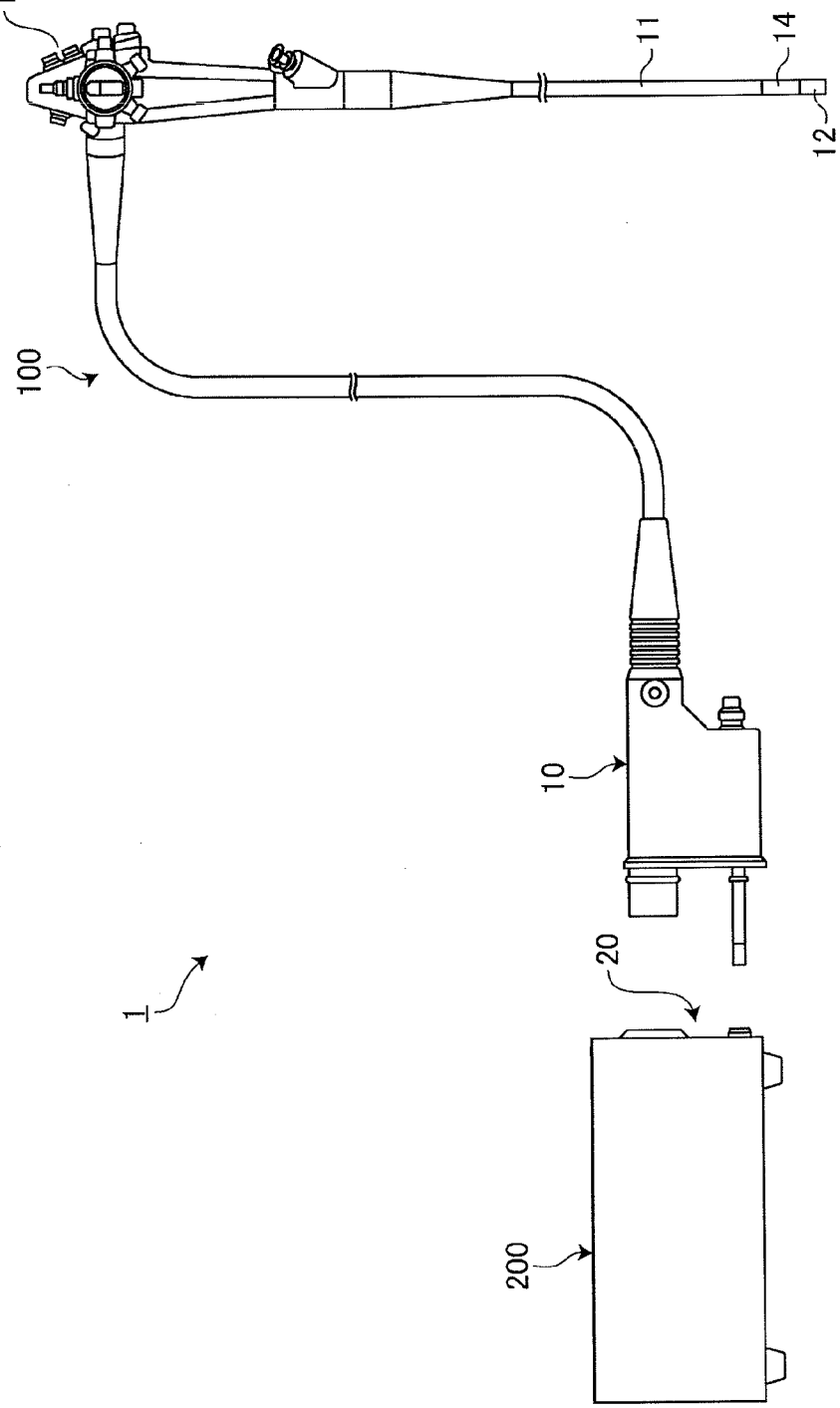
FIG. 1 is an external view of an electronic endoscope system according to an embodiment of the present invention.

FIG. 1 is an external view of an electronic endoscope system 1 of the present embodiment. As shown in FIG. 1, the electronic endoscope system 1 of the present embodiment includes an electronic endoscope 100 and a processor 200. The processor 200 is a device that integrally includes a signal processing device that processes signals from the electronic endoscope 100 and a light source device that, via the electronic endoscope 100, illuminates the interior of a body cavity which natural light does not reach. The signal processing device and the light source device may be configured separately in another embodiment.

As shown in FIG. 1, the electronic endoscope 100 includes an insertion portion flexible tube 11 that is covered by a flexible sheath. The tip portion (a bending portion 14) of the insertion portion flexible tube 11 bends according to a remote operation from a hand operation portion 13 coupled to the base end of the insertion portion flexible tube 11. The bending mechanism is a known mechanism incorporated in common endoscopes, and causes the bending portion 14 to bend using the pulling of an operation wire in conjunction with a rotation operation of a curvature operation knob of the hand operation portion 13. A base end of a tip portion 12, which is covered by a hard resin casing, is coupled to the tip of the bending portion 14. The orientation of the tip portion 12 changes according to a bending operation performed using a rotation operation of the curvature operation knob, thus moving the imaging region of the electronic endoscope 100.

The processor 200 is provided with a connector portion 20 that has a coupling structure that corresponds to a connector portion 10 provided on the base end of the electronic endoscope 100. The electronic endoscope 100 and the processor 200 are electrically and optically connected by mechanically connecting the connector portion 20 to the connector portion 10.

Figure 2:
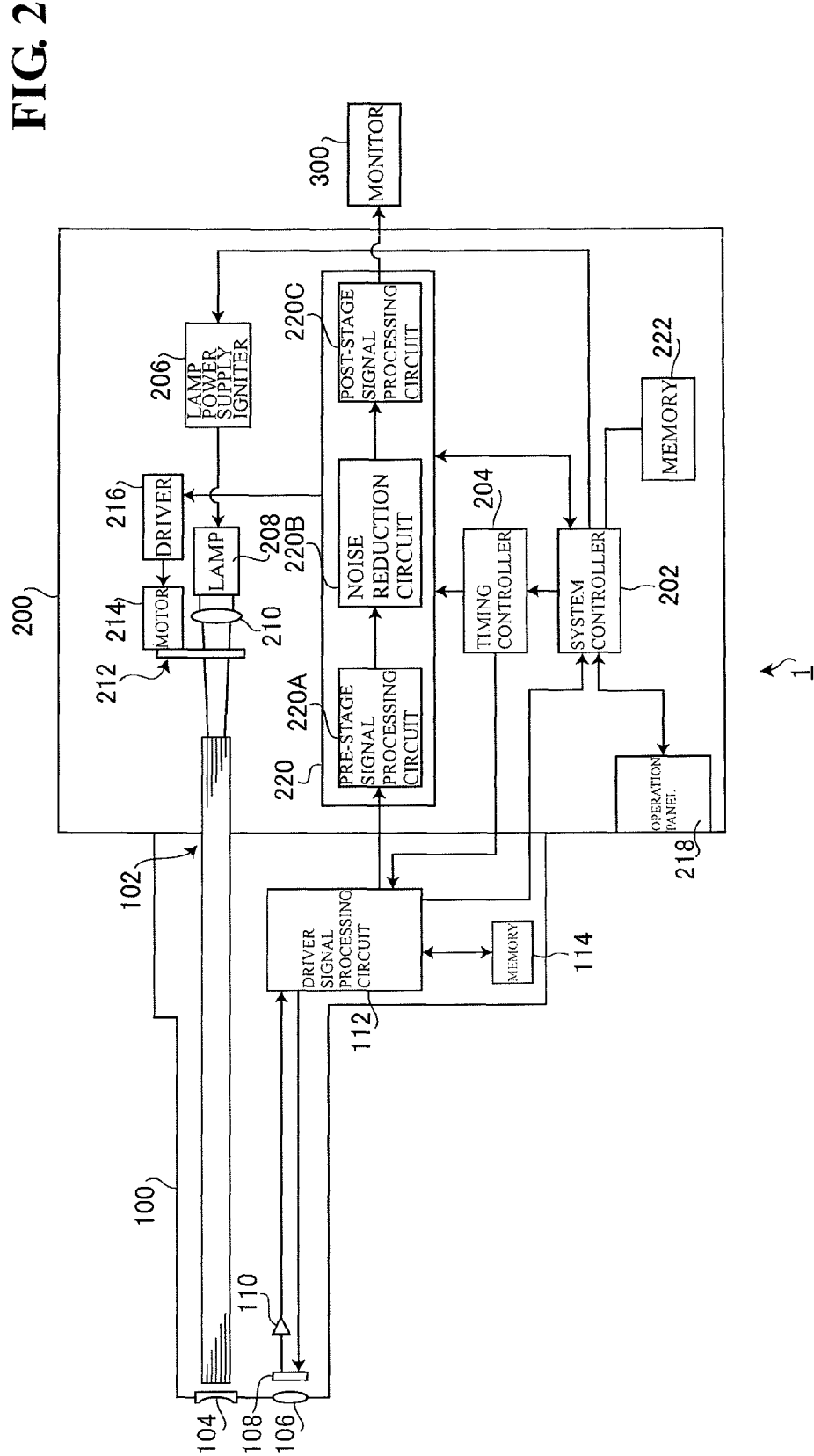
FIG. 2 is a block diagram of the electronic endoscope system according to the embodiment of the present invention.

FIG. 2 is a block diagram showing the configuration of the electronic endoscope system 1 of the present embodiment.

As shown in FIG. 2, a monitor 300 is connected to the processor 200 in the electronic endoscope system 1.

As shown in FIG. 2, the processor 200 has a system controller 202 and a timing controller 204. The system controller 202 performs overall control of the entirety of electronic endoscope system 1 by executing various programs stored in a memory 222. The system controller 202 also changes various settings of the electronic endoscope system 1 according to instructions input to an operation panel 218 by a user (operator or assistant). Note that the configuration of the operation panel 218 can take various forms. Conceivable examples of specific configurations of the operation panel 218 include function-specific hardware keys or a touch panel type of GUI (Graphical User Interface) implemented on the front surface of the processor 200, and a combination of hardware keys and a GUI. The timing controller 204 outputs a clock pulse, which is for adjustment of the timing of the operations of portions, to circuits in the electronic endoscope system 1.

A lamp 208 is activated by a lamp power supply igniter 206 and thereafter emits light having a spectrum that mainly spreads from the visible light region to the invisible infrared light region (or light that includes at least the visible light region). A high-intensity lamp such as a xenon lamp, a halogen lamp, or a metal halide lamp is suitable as the lamp 208. The irradiation light emitted by the lamp 208 is condensed by a condensing lens 210 and limited to a suitable light quantity via a diaphragm 212.

A motor 214 is mechanically coupled to the diaphragm 212 via a transmission mechanism such as an arm or a gear that is not shown in the drawings. The motor 214 is a DC motor, for example, and is driven under the drive control of a driver 216. The diaphragm 212 is actuated by the motor 214 so as to change the opening degree thereof in order to set the image displayed on the display screen of the monitor 300 to an appropriate brightness. The light quantity of the light emitted by the lamp 208 is limited according to the opening degree of the diaphragm 212. The reference image brightness that is considered to be appropriate is set according to an intensity adjustment operation performed on the operation panel 218 by the operator. Note that the light control circuit that controls the driver 216 to perform intensity adjustment is a known circuit, and will not be described in this specification.

Irradiation light that has passed through the diaphragm 212 enters the entrance end of a LCB (Light Carrying Bundle) 102. The irradiation light that has entered the LCB 102 through the entrance end propagates by repeatedly undergoing total reflection inside the LCB 102. The irradiation light that has propagated inside the LCB 102 exits through an exit end of the LCB 102 arranged inside the tip portion 12 of the electronic endoscope 100, and illuminates the subject via a light distribution lens 104.

Returning light from the subject passes through an objective lens 106 and is formed into an optical image by pixels on the light receiving surface of a solid-state imaging element 108. The solid-state imaging element 108 is an interlace type of single-plate color CCD (Charge Coupled Device) image sensor that has a complementary color checkered pixel arrangement. The solid-state imaging element 108 generates yellow Ye, cyan Cy, green G, and magenta Mg complementary color signals by accumulating charge according to the light quantity of the optical image formed by the pixels on the light receiving surface, and successively outputs a mixed signal obtained by adding the complementary color signals generated by two pixels that are adjacent in the vertical direction. Hereinafter, the mixed signals that correspond to the pixels in the horizontal lines in respective fields and that are successively output by the solid-state imaging element 108 will be referred to as "imaging signals". Note that the solid-state imaging element 108 is not limited to being a CCD image sensor, and a CMOS (Complementary Metal Oxide Semiconductor) image sensor or another type of imaging device may be employed. The solid-state imaging element 108 may also be an element that includes a primary color filter (Bayer array filter).

The imaging signals output from the solid-state imaging element 108 are subjected to signal amplification by a preamplifier 110 and then input to a signal processing circuit 220 via a driver signal processing circuit 112.

The electronic endoscope 100 includes the driver signal processing circuit 112 and a memory 114. The driver signal processing circuit 112 accesses the memory 114 and reads out unique information regarding the electronic endoscope 100. The unique information regarding the electronic endoscope 100 recorded in the memory 114 includes, for example, the pixel count, sensitivity, operable field rate (framerate), and model number of the solid-state imaging element 108. The unique information read out from the memory 114 is output by the driver signal processing circuit 112 to the system controller 202.

The system controller 202 generates a control signal by performing various arithmetic operations based on the unique information regarding the electronic endoscope 100. The system controller 202 uses the generated control signal to control the operations of and the timing of various circuits in the processor 200 so as to perform processing suited to the electronic endoscope currently connected to the processor 200.

The timing controller 204 supplies a clock pulse to the driver signal processing circuit 112 and the signal processing circuit 220 in accordance with timing control performed by the system controller 202. In accordance with the clock pulse supplied from the timing controller 204, the driver signal processing circuit 112 controls the driving of the solid-state imaging element 108 according to a timing synchronized with the field rate (framerate) of the images processed by the processor 200.

As shown in FIG. 2, the signal processing circuit 220 includes a pre-stage signal processing circuit 220A, a noise reduction circuit 220B, and a post-stage signal processing circuit 220C.

The pre-stage signal processing circuit 220A generates pixel signals (a luminance signal Y and color difference signals U and V) by performing predetermined signal processing such as color interpolation and Y/C separation on the imaging signals received from the driver signal processing circuit 112, and outputs the generated pixel signals to the noise reduction circuit 220B.

Figure 3:
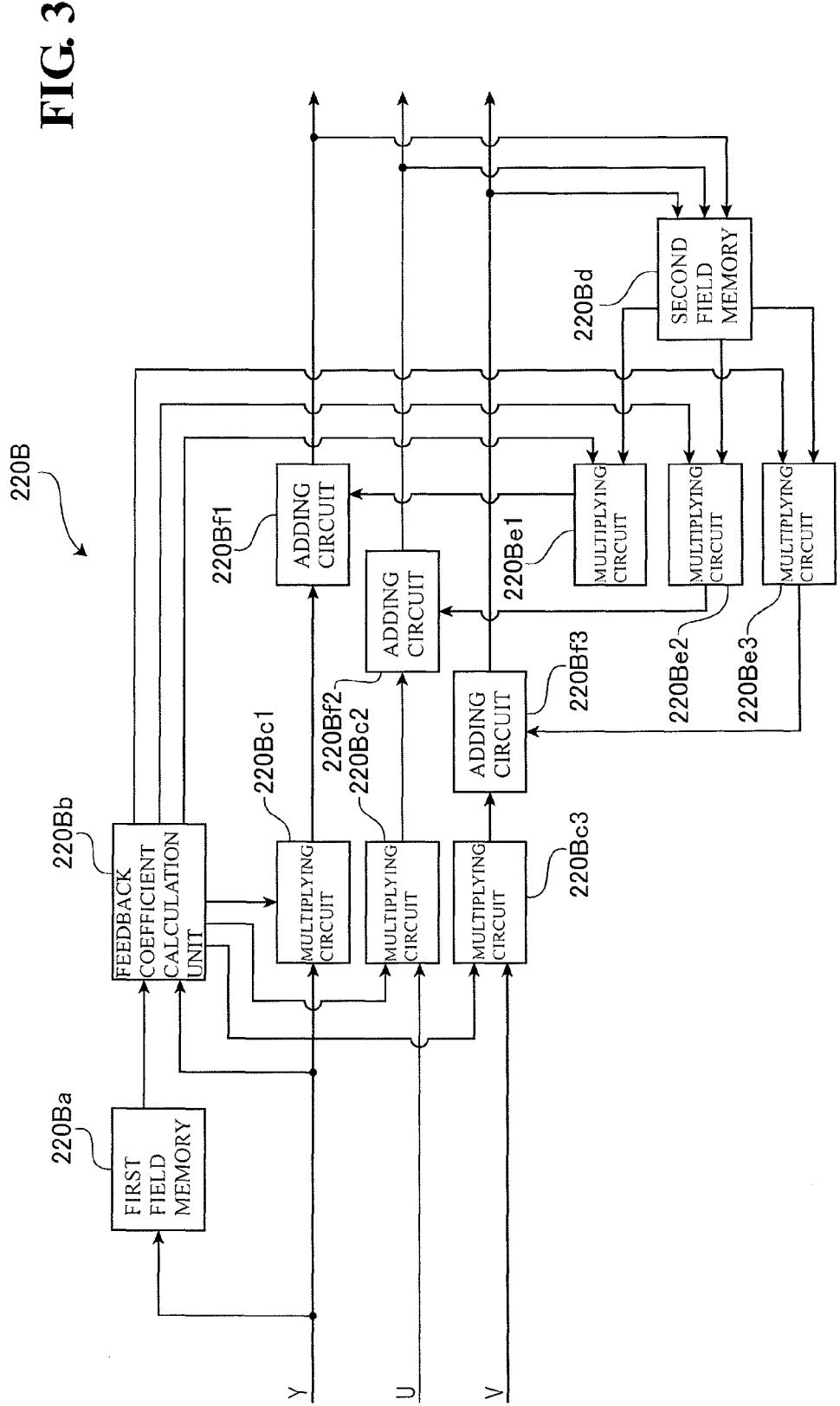
FIG. 3 is a block diagram showing a configuration of a noise reduction circuit included in a processor according to the embodiment of the present invention.

FIG. 3 is a block diagram showing the configuration of the noise reduction circuit 220B. As shown in FIG. 3, the noise reduction circuit 220B includes a first field memory 220Ba, a feedback coefficient calculation unit 220Bb, multiplying circuits 220Bc1 to 220Bc3, a second field memory 220Bd, multiplying circuits 220Be1 to 220Be3, and adding circuits 220Bf1 to 220Bf3.

The first field memory 220Ba receives pixel signals (luminance signals Y) from the pre-stage signal processing circuit 220A. At least one field worth of pixel signals (pixel signals in an effective pixel region) are buffered in the first field memory 220Ba.

The feedback coefficient calculation unit 220Bb successively receives the pixel signals (luminance signals Y) of the current field from the pre-stage signal processing circuit 220A, and at the same time successively receives the pixel signals (luminance signals Y) of one field earlier that correspond to these pixel signals from the first field memory 220Ba. Here, the pixel signals of pixels in the same line and at the same address will be called "corresponding pixel signals". For example, the pixel signal of one field earlier that corresponds to the pixel signal that is to be output first in the second horizontal line of an odd-numbered field is the pixel signal that was output first in the second horizontal line of the immediately previous even-numbered field.

Description of Operations of Feedback Coefficient Calculation Unit 220Bb

Figure 4:
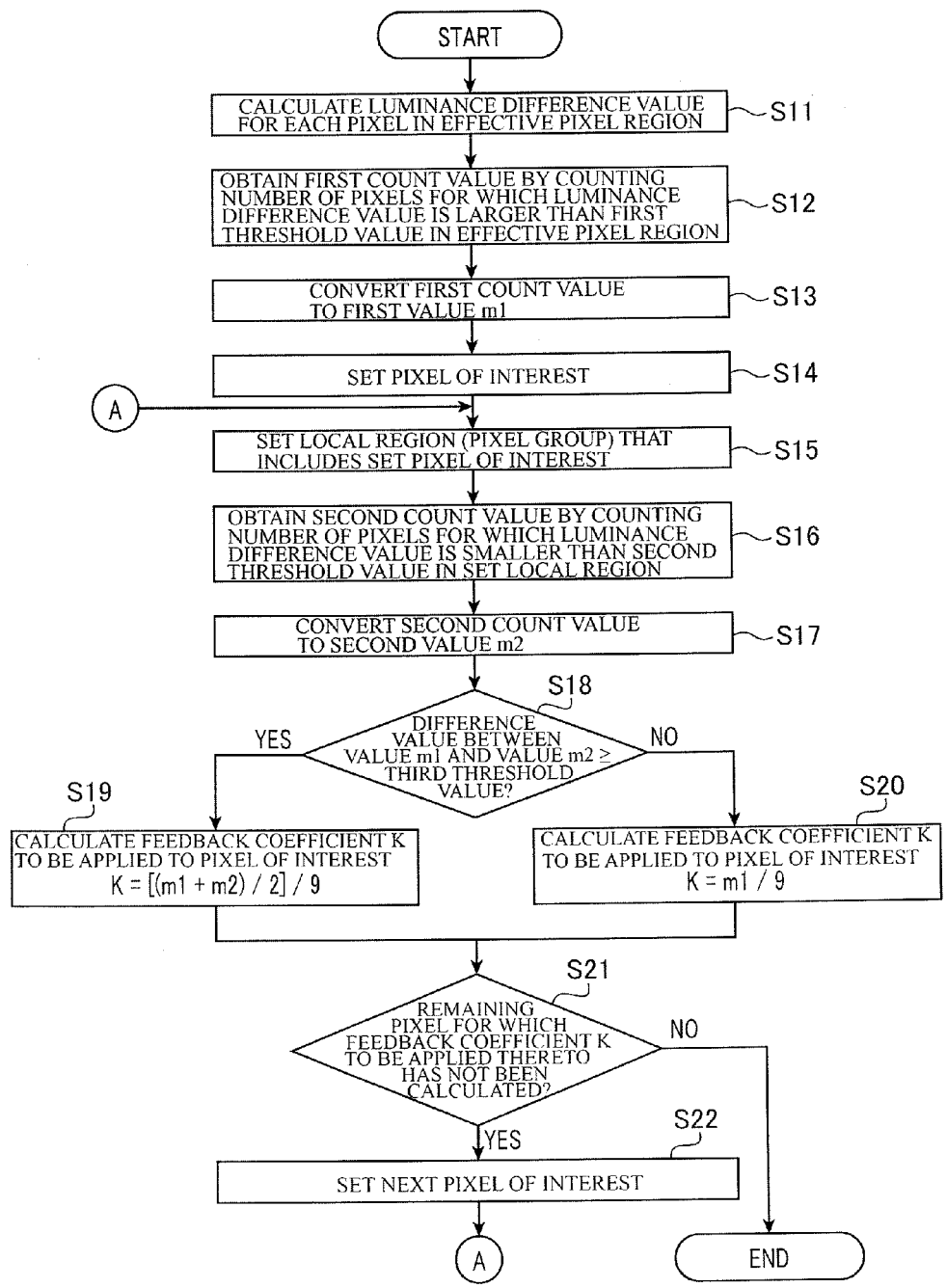
FIG. 4 is a flowchart showing operations of a feedback coefficient calculation unit included in the noise reduction circuit according to the embodiment of the present invention.

FIG. 4 is a flowchart showing operations of the feedback coefficient calculation unit 220Bb.

S11 (Calculation of Luminance Difference Value) in FIG. 4

As shown in FIG. 4, in processing step S11, for each pixel in the effective pixel region, a difference value is calculated between the pixel signal (luminance signal Y) of the current field and the pixel signal (luminance signal Y) of one field earlier. Hereinafter, for the sake of convenience in the description, the pixel signal (luminance signal Y) difference value calculated in processing step S11 will be referred to as the "luminance difference value". Also, the pixel signal of the current field (luminance signal Y, color difference signals U and V) will be referred to as the "current field pixel signal nfs", and the pixel signal of one field earlier (luminance signal Y, color difference signals U and V) will be referred to as the "previous field pixel signal pfs".

S12 (Calculation of First Count Value) in FIG. 4

FIG. 5(a) is a diagram conceptually showing motion detection in an entire field. In processing step S12, the following processing is performed in order to perform motion detection in the entire field as shown in FIG. 5(a).

Processing step S12 is a step for counting the number of pixels, among the pixels in the effective pixel region, for which the luminance difference value calculated in processing step S11 is larger than a first threshold value. Specifically, in processing step S12, in order to perform motion detection in the entire field, for two consecutive fields, the number of pixels for which the luminance difference value is larger than the first threshold value is counted, with the entire field as the range. Hereinafter, for the sake of convenience in the description, the number of pixels counted in processing step S12 will be referred to as the "first count value".

S13 (Conversion to First Value M1) in FIG. 4

In processing step S13, the first count value counted in processing step S12 is converted to the first value m1. Here, FIG. 6(a) shows a graph representation of a function for conversion between the first count value and the first value m1. In FIG. 6(a), the vertical axis indicates the first value m1, and the horizontal axis indicates the first count value. The first value m1 takes a value from 0 to 9.

As shown in FIG. 6(a), the first count value is converted to a fixed value (here, "9") if it is smaller than or equal to a fixed value C, and is converted to a smaller value the higher above the fixed value C it is. More specifically, the first count value is converted to a smaller value relative to "9" the higher above the fixed value C it is, and is converted to "0" if it has its maximum value (i.e., if the luminance difference value is larger than the first threshold value in all of the pixels in the effective pixel region).

As a trend, the first value m1 takes a small value if there are many regions with movement of the subject in the entire field (if there are many pixels for which the luminance difference value is larger than the first threshold value), and takes a large value if there are few regions with movement of the subject in the entire field (if there are few pixels for which the luminance difference value is larger than the first threshold value). More concisely, in the case where the entire field is the detection range, the first value m1 takes a small value if the subject is moving, and takes a large value if the subject is not moving.

S14 (Setting of Pixel of Interest) in FIG. 4

In processing step S14, one pixel in the effective pixel region is set as the pixel of interest.

S15 (Setting of Local Region (Pixel Group)) in FIG. 4

Processing step S15 is a step for setting a pixel group made up of the pixel of interest that was set in processing step S14 and surrounding pixels around the pixel of interest. Note that in the present embodiment, the surrounding pixels refer to a total of eight pixels that are located adjacent to the pixel of interest in the up, down, left, and right directions, as well as the diagonally upper-right direction, the diagonally lower-right direction, the diagonally upper-left direction, and the diagonally lower-left direction. In other words, the pixel group is made up of nine pixels arranged in a 3×3 matrix.

S16 (Calculation of Second Count Value) in FIG. 4

FIG. 5(b) is a diagram conceptually showing motion detection in a local region (region made up of the 3×3 pixels that correspond to the pixel group). In processing step S16, the following processing is performed in order to perform motion detection in a local region as shown in FIG. 5(b).

Processing step S16 is a step for counting the number of pixels, in the pixel group (1 pixel of interest+8 surrounding pixels), for which the luminance difference value calculated in processing step S11 is smaller than a second threshold value. Specifically, in processing step S16, in order to perform motion detection in the local region, for two consecutive fields, the number of pixels for which the luminance difference value is smaller than the second threshold value is counted, with the pixel group set in processing step S15 as the range. Hereinafter, for the sake of convenience in the description, the number of pixels counted in processing step S16 will be referred to as the "second count value".

S17 (Conversion to Second Value M2) in FIG. 4

In processing step S17, the second count value counted in processing step S16 is converted to the second value m2. Here, FIG. 6(b) shows a graph representation of a function for conversion between the second count value and the second value m2. In FIG. 6(b), the vertical axis indicates the second value m2, and the horizontal axis indicates the second count value. Likewise to the first value m1, the second value m2 also takes a value from 0 to 9.

As shown in FIG. 6(b), the second count value is converted to the number of pixels for which the luminance difference value is smaller than the second threshold value (a value from 0 to 9). In other words, the second value m2 takes the value of the second count value as is.

The second value m2 takes a small value if there are many regions with movement of the subject in the local region (if there are many pixels for which the luminance difference value is larger than the second threshold value), and takes a large value if there are few regions with movement of the subject in the local region (if there are few pixels for which the luminance difference value is larger than the second threshold value). More concisely, in the case where the local region is the detection range, the second value m2 takes a small value if the subject is moving, and takes a large value if the subject is not moving.

S18 (Comparison of First Value M1 and Second Value M2) in FIG. 4

In processing step S18, the difference value between the first value m1 and the second value m2 is calculated. Next, it is determined whether or not the calculated difference value is greater than or equal to a third threshold value.

S19 (Calculation of Feedback Coefficient K) in FIG. 4

Processing step S19 is performed if the difference value calculated in processing step S18 is greater than or equal to the third threshold value (S18: YES). The difference value calculated in processing step S18 is typically greater than or equal to the third threshold value in Case 1 and Case 2 described below.

Case 1

Case 1 is a case in which there are many regions with movement of the subject in the entire field, and there are few regions with movement of the subject in a local region. In Case 1, for example, portions with movement of the subject are widely distributed throughout the field, but the subject is not moving very much when a local region is viewed, and therefore although it is detected that the subject is moving in the entire field, it is detected that the subject is not moving in a local region.

Case 2

Case 2 is a case in which there are few regions with movement of the subject in the entire field, and there are many regions with movement of the subject in a local region. In Case 2, for example, the subject is not moving very much when the entire field is viewed, but the subject is moving when a local region is viewed, and therefore although it is detected that the subject is moving in a local region, it is detected that the subject is not moving in the entire field.

In this way, in the case where the difference value calculated in processing step S18 is greater than or equal to the third threshold value, the result of subject motion detection differs between when the entire field is viewed and when a local region is viewed. For this reason, it is desirable that both the situation when viewing subject motion in the entire field and the situation when viewing subject motion in a local region are taken into consideration for the pixel signal of the pixel of interest that belongs to the local region (pixel group). In view of this, in processing step S19, a feedback coefficient K that is to be applied to the pixel signal of the pixel of interest that belongs to the local region (pixel group) is calculated using the following expression.

$$K=[(m1+m2)/2]/9$$

S20 (Calculation of Feedback Coefficient K) in FIG. 4

Processing step S20 is performed if the difference value calculated in processing step S18 is less than the third threshold value (S18: NO). The difference value calculated in processing step S18 is typically less than the third threshold value in Case 3 and Case 4 described below.

Case 3

Case 3 is a case in which there are few regions with movement of the subject in the entire field, and there are also few regions with movement of the subject in a local region. In Case 3, for example, the subject is not moving very much when viewing not only the entire field, but also a local region, and therefore it is detected that the subject is not moving in any detection range.

Case 4

Case 4 is a case in which there are many regions with movement of the subject in the entire field, and there are also many regions with movement of the subject in a local region. In Case 4, for example, the moving subject is widely distributed throughout the field, and the subject is moving when a local region is viewed as well, and therefore it is detected that the subject is moving in any detection range.

In this way, in the case where the difference value calculated in processing step S18 is less than the third threshold value, the result of subject motion detection is the same when the entire field is viewed and when a local region is viewed. For this reason, it is desirable that either the situation when viewing subject motion in the entire field or the situation when viewing subject motion in a local region is taken into consideration for the pixel signal of the pixel of interest that belongs to the local region (pixel group). In view of this, in processing step S20, the feedback coefficient K that is to be applied to the pixel signal of the pixel of interest that belongs to the local region (pixel group) is calculated using the following expression.

$$K=m1/9$$

Note that in another embodiment, the above expression may be replaced with the following expression.

$$K=m2/9$$

S21 and S22 (Unprocessed Pixel Determination) in FIG. 4

In processing step S21, it is determined whether or not a pixel for which the feedback coefficient K to be applied thereto has not been calculated remains in the effective pixel region. If a pixel for which the feedback coefficient K to be applied thereto has not been calculated remains (S21: YES), the pixel of interest is set to the next pixel (e.g., the pixel that is adjacent in the horizontal line direction) (S22). When the next pixel of interest is set, this flowchart returns to processing step S15. By looping through processing steps S15 to S22, the feedback coefficient K is successively calculated for each pixel in the effective pixel region. When the feedback coefficient K has been calculated for all of the pixels in the effective pixel region (S21: NO), this flowchart escapes the loop and ends.

The feedback coefficient K that was calculated in the feedback coefficient calculation unit 220Bb is input to the multiplying circuits 220Bc1 to 220Bc3 and the multiplying circuits 220Be1 to 220Be3.

The multiplying circuits 220Bc1 to 220Bc3 respectively receive the current field pixel signal nfs (luminance signal Y), the current field pixel signal nfs (color difference signal U), and the current field pixel signal nfs (color difference signal V) from the pre-stage signal processing circuit 220A. The current field pixel signal nfs (luminance signal Y), the current field pixel signal nfs (color difference signal U), and the current field pixel signal nfs (color difference signal V) that were input to the multiplying circuits 220Bc1 to 220Bc3 are each multiplied by the value (1−feedback coefficient K). Hereinafter, for the sake of convenience in the description, the multiplied values obtained by the multiplying circuits 220Bc1 to 220Bc3 are respectively called the "multiplied value (luminance signal Y) [nfs×(1−K)]", the "multiplied value (color difference signal U) [nfs×(1−K)]", and the "multiplied value (color difference signal V) [nfs×(1−K)]".

The multiplied value (luminance signal Y) [nfs×(1−K)], the multiplied value (color difference signal U) [nfs×(1−K)], and the multiplied value (color difference signal V) [nfs×(1−K)] are respectively input to the adding circuits 220Bf1 to 220Bf3.

The second field memory 220Bd receives corrected image signals (luminance signal Y and color difference signals U and V) output from the adding circuits 220Bf1 to 220Bf3. Note that the corrected image signals are image signals that have been subjected to noise reduction, and will be described in detail later. At least one field worth of pixel signals (pixel signals in the effective pixel region) are buffered in the second field memory 220Bd.

The multiplying circuits 220Be1 to 220Be3 respectively receive the previous field pixel signal pfs (corrected luminance signal Y), the previous field pixel signal pfs (corrected color difference signal U), and the previous field pixel signal pfs (corrected color difference signal V) from the second field memory 220Bd. The previous field pixel signal pfs (corrected luminance signal Y), the previous field pixel signal pfs (corrected color difference signal U), and the previous field pixel signal pfs (corrected color difference signal V) that were input to the multiplying circuits 220Be1 to 220Be3 are each multiplied by the feedback coefficient K. Hereinafter, for the sake of convenience in the description, the multiplied values obtained by the multiplying circuits 220Be1 to 220Be3 are respectively called the "multiplied value (luminance signal Y) [pfs×K]", the "multiplied value (color difference signal U) [pfs×K]", and the "multiplied value (color difference signal V) [pfs×K]".

The multiplied value (luminance signal Y) [pfs×K], the multiplied value (color difference signal U) [pfs×K], and the multiplied value (color difference signal V) [pfs×K] are respectively input to the adding circuits 220Bf1 to 220Bf3.

The adding circuit 220Bf1 adds the multiplied value (luminance signal Y) [nfs×(1−K)] received from the multiplying circuit 220Bc1 and the multiplied value (luminance signal Y) [pfs×K] received from the multiplying circuit 220Be1, and outputs the result to the post-stage signal processing circuit 220C. The adding circuit 220Bf2 adds the multiplied value (color difference signal U) [nfs×(1−K)] received from the multiplying circuit 220Bc2 and the multiplied value (color difference signal U) [pfs×K] received from the multiplying circuit 220Be2, and outputs the result to the post-stage signal processing circuit 220C. The adding circuit 220Bf3 adds the multiplied value (color difference signal V) [nfs×(1−K)] received from the multiplying circuit 220Bc3 and the multiplied value (color difference signal V) [pfs×K] received from the multiplying circuit 220Be3, and outputs the result to the post-stage signal processing circuit 220C.

In other words, the adding circuits Bf1 to Bf3 correct the current field pixel signal nfs by using the expression shown below to mix the current field pixel signal nfs and the previous field pixel signal pfs. As shown in the expression below, the mixing ratio of the current field pixel signal nfs and the previous field pixel signal pfs is determined according to the feedback coefficient K. The feedback coefficient K takes a smaller value the more the subject is moving, and takes a larger value the less the subject is moving. The closer the feedback coefficient K is to 0, the higher the proportion of the current field pixel signal nfs becomes, and therefore the noise reduction effect decreases in the corresponding pixel, but an afterimage is suppressed. Also, the closer the feedback coefficient K is to 1, the higher the proportion of the previous field pixel signal pfs becomes, and therefore the noise reduction effect increases in the corresponding pixel.

$$\text{Corrected current field pixel signal } nfs'=[nfs\times(1-K)]+[pfs\times K]$$

The post-stage signal processing circuit 220C converts the corrected current field pixel signals nfs' (luminance signal Y and color difference signals U and V) received from the adding circuits 220Bf1 to 220Bf3 into a video signal compliant with a predetermined standard such as NTSC (National Television System Committee) or PAL (Phase Alternating Line), and outputs the converted video signal to the monitor 300. The video signal is successively input to the monitor 300, and thus color images of the subject are displayed on the display screen of the monitor 300.

In this way, according to the present embodiment, the feedback coefficient K for each pixel is calculated taking into consideration both the result of subject motion detection in the entire field and the result of subject motion detection in a local region, thus suppressing afterimages of a subject that is in motion, while also reducing noise in images.

The foregoing description is a description of an illustrative embodiment of the present invention. The embodiments of the present invention are not limited to the foregoing description, and various modifications can be made within the scope of the technical idea of the present invention. For example, the embodiments of this application also include appropriate combinations of embodiments and the like explicitly specified in this specification and obvious embodiments and the like.

Although the imaging period of the solid-state imaging element 108 is a field period in the above embodiment, in another embodiment it may be a frame period.

The invention claimed is:

1. An electronic endoscope system comprising:
an electronic endoscope having an imaging element; and
a processor having an image processing device, the image processing device comprising:
a controller; and
a memory that stores instructions that, when executed by the controller, cause the controller to perform operations including:
calculating for each pixel in an effective pixel region of the imaging element that cyclically images a subject in a predetermined imaging period, a difference value between a pixel signal of a current imaging period output by the imaging element and a pixel signal of one imaging period earlier;
detecting motion of the subject, with the entire effective pixel region as a range;
successively setting each of the pixels in the effective pixel region as a pixel of interest;
detecting motion of the subject, with a local pixel region that includes the successively set pixel of interest as a range;
determining, for each of the pixels of interest, a mixing ratio for the pixel signal of the current imaging period and the pixel signal of one imaging period earlier, based on a detection result of the the detecting motion of the subject, with the entire effective pixel region as a range, and the detecting motion of the subject, with a local pixel region that includes the successively set pixel of interest as a range; and
correcting, for each of the pixels of interest, the pixel signal of the current imaging period based on the mixing ratio determined.

2. The electronic endoscope system according to claim 1, wherein the imaging period is one field period or one frame period.

3. An electronic endoscope system comprising:
an electronic endoscope having an imaging element; and
a processor having an image processing device, the image processing device comprising:
a controller; and
a memory that stores instructions that, when executed by the controller, cause the controller to perform operations including:
calculating, for each pixel in an effective pixel region of the imaging element that cyclically images a subject in a predetermined imaging period, a difference value between a pixel signal of a current imaging period output by the imaging element and a pixel signal of one imaging period earlier;
counting the number of pixels for which the difference value satisfies a first condition in the effective pixel region, and set the counted number of pixels as a first count value;
successively setting each of the pixels in the effective pixel region as a pixel of interest;
counting the number of pixels for which the difference value satisfies a second condition in a pixel group made up of the successively set pixel of interest and surrounding pixels around the pixel of interest, and setting the counted number of pixels as a second count value;
determining, for each of the pixels of interest, determine a mixing ratio for the pixel signal of the current imaging period and the pixel signal of one imaging period earlier, based on the second count value in the pixel group to which the pixel of interest belongs and the first count value; and
correcting, for each of the pixels of interest, correct the pixel signal of the current imaging period based on the mixing ratio determined.

4. The electronic endoscope system according to claim 3, wherein the determining of the mixing ratio comprises:
converting the first count value to a first value,
converting the second count value to a second value, and
determining the mixing ratio for the pixel signal of the current imaging period and the pixel signal of one imaging period earlier based on a difference value between the first value and the second value.

5. The electronic endoscope system according to claim 4, wherein a numerical value range of the first value and a numerical value range of the second value are the same.

6. The electronic endo scope system according to claim 5, wherein the first condition is that the difference value is larger than a first threshold value,
the second condition is that the difference value is smaller than a second threshold value,
the first count value is converted to a maximum value in the numerical value range if the first count value is smaller than or equal to a fixed value, and is converted to a smaller value relative to the maximum value the higher above the fixed value the first count value is,
the second count value is converted as is to the second count value, and
the determining of the mixing ratio further comprises:
determining the mixing ratio based on the first value and the second value in a case where the difference value between the first value and the second value is greater than or equal to a third threshold value, and
determining the mixing ratio based on the first value or the second value in a case where the difference value between the first value and the second value is less than the third threshold value.

7. The electronic endoscope system according to claim 3, wherein the imaging period is one field period or one frame period.

* * * * *